US005355381A

United States Patent [19]

Leilabady

[11] Patent Number: 5,355,381

[45] Date of Patent: Oct. 11, 1994

[54] SELF-HETERODYNE OPTICAL FIBER COMMUNICATIONS SYSTEM

[75] Inventor: Pedram Leilabady, Lisle, Ill.

[73] Assignee: Amoco Corporation, Chicago, Ill.

[21] Appl. No.: 985,821

[22] Filed: Dec. 3, 1992

[51] Int. Cl.[5] .............. H01S 3/10

[52] U.S. Cl. .............. 372/28; 359/156; 359/173; 359/182; 372/23; 385/24

[58] Field of Search .............. 372/23, 26, 27, 28; 385/1-3, 15, 24; 359/122, 124, 132, 156, 173, 181, 182, 191, 192

[56] References Cited

U.S. PATENT DOCUMENTS

| | | | |
|---|---|---|---|
| 4,637,027 | 1/1987 | Shirasaki et al. | 372/27 |
| 4,726,011 | 2/1988 | Ih et al. | 359/191 X |
| 4,817,206 | 3/1989 | Calvani et al. | 359/156 |
| 4,973,169 | 11/1990 | Slonecker | 359/124 |
| 5,091,912 | 2/1992 | Bretenaker et al. | 372/23 |
| 5,091,913 | 2/1992 | Zhang et al. | 372/23 |
| 5,222,089 | 6/1993 | Huber | 372/26 |

*Primary Examiner*—John D. Lee

*Attorney, Agent, or Firm*—Stephen G. Mican

[57] ABSTRACT

An apparatus and method are disclosed for use in an antenna remoting system. The apparatus comprises a single source of laser light having an output characterized by two distinct polarizations and at least two closely separated frequencies, and a fiber optic communications link joined to the source and having a modulator therein which is driven by a radio frequency information signal such that said modulator produces a beat frequency output which is a function of the sum of the two closely separated frequencies.

30 Claims, 2 Drawing Sheets

SELF-HETERODYNE OPTICAL FIBER COMMUNICATIONS SYSTEM

TECHNICAL FIELD

This invention relates to the general subject of fiber optical systems and, in particular, to methods and apparatus utilizing doubly-polarized lasers for remote antenna applications, and the like.

BACKGROUND OF THE INVENTION

One important use of fiber optics is in antenna remoting applications. In such an application wide bandwidth (multi-channel) radio frequency (RF) information is remotely collected and converted into an analog signal for transmission over the ground. Systems based on antenna remoting technology are often deployed as listening stations to gather information for intelligence purposes. Antenna remoting is also used where geographic barriers prohibit the use of high power or the housing of processing electronics at the receiver. The remotely located antenna can receive standard radio and television signals as well as military (RF) transmissions, over a very wide range of frequencies (virtually the entire RF spectrum). Very large amounts of data must be transmitted at high speed and often the system must be easily transportable. Consequently, conventional transmission via copper coaxial cable or RF waveguides (i.e., metal pipes or tubes) is not practical.

Converting the RF signals into an optical analog output for transmission through a fiber-optic cable is necessary in order to avoid the bandwidth and loss limitations of coaxial cables or waveguides. Externally modulated, fiber-optic links are one means of antenna remoting for ground-based systems (e.g., See U.S. Pat. No. 4,070,621). Elementary antenna remoting systems have used two polarized laser sources and single mode optical fiber between the sources and the modulator. Direct modulation detection is used. This approach is relatively inexpensive, although there is a 3 dB power budget penalty.

One difficulty of conventional antenna remoting systems is that such systems are sensitive to environmental effects. A "standard" single mode fiber carries two polarization modes. In a perfect waveguide without any external environmental effects, those two polarization modes will be degenerate (i.e. they will be in phase). As you introduce variations, either through an external effect, such as small temperature changes or just because it is difficult to make a perfect, totally unstressed waveguide, the two polarization modes will lose their degeneracy, introducing a phase difference between them. Thus, a polarized input light signal will tend to transfer power between those two polarization modes, thereby scrambling the polarization signal. So, in the real world, singlemode fibers do not maintain a stable state of polarization. That has an impact on polarization-sensitive devices, such as many external modulators, and explains why the fiberoptic community has developed an interest in polarization-maintaining fibers.

Polarization maintaining (PM) optical fibers are better. Typical designs of polarization-maintaining fibers today create a propagation difference between those two modes, favoring one at the expense of the other. A polarized light signal launched into that favored polarization mode will tend to have its polarization state maintained down the length of the fiber and the output signal's polarization will be identical to, or at least similar to, the input signal's. Unfortunately, such optical fibers are more expensive.

SUMMARY OF THE INVENTION

A specific object of the invention is to provide a single, doubly-polarized, solid-state laser source for use in a fiber optic optical communications link utilizing either single mode optical fiber or polarization maintaining optical fiber.

One general object of the invention is to provide several remote antenna schemes with improved performance characteristics.

Another object of the invention is to provide a fiber optic communication link using a doubly polarized laser source, an optical modulator and either single mode or polarization maintaining optical fiber.

Still another object of the invention is to provide a method for reducing the noise content in a modulated optical signal traveling through optical fiber.

In accordance with the present invention, an apparatus for use in an antenna remoting system is provided comprising: a single source of laser light having an output characterized by two distinct polarizations and at least two closely separated frequencies; and a fiber optic communications link joined to said source and having a modulator therein which is driven by a radio frequency information signal such that said modulator produces a beat frequency output which is a function of the sum of said two closely separated frequencies, said beat frequency output having radio frequency side bands corresponding to said radio frequency information signal.

In one embodiment the source comprises: a single source of laser light characterized by two spatially superimposed and orthogonal linearly polarized modes at two closely separated frequencies. Specific embodiments of the invention comprise remote antenna systems having single mode optical fiber, birefringent optical fiber, intensity modulators, and phase modulators having a range of performance characteristics. One important advantage of these systems is that, since "noise" in such systems is a function of frequency, system noise is reduced when the single laser source of two closely spaced frequencies are added together (i.e., self heterodyning) and polarization maintaining optical fiber is used. Numerous other advantages and features of the present invention will become readily apparent from the following detailed description of the invention, the embodiments described therein, from the claims, and from the accompanying drawings.

DETAILED DESCRIPTION

Figure 1:
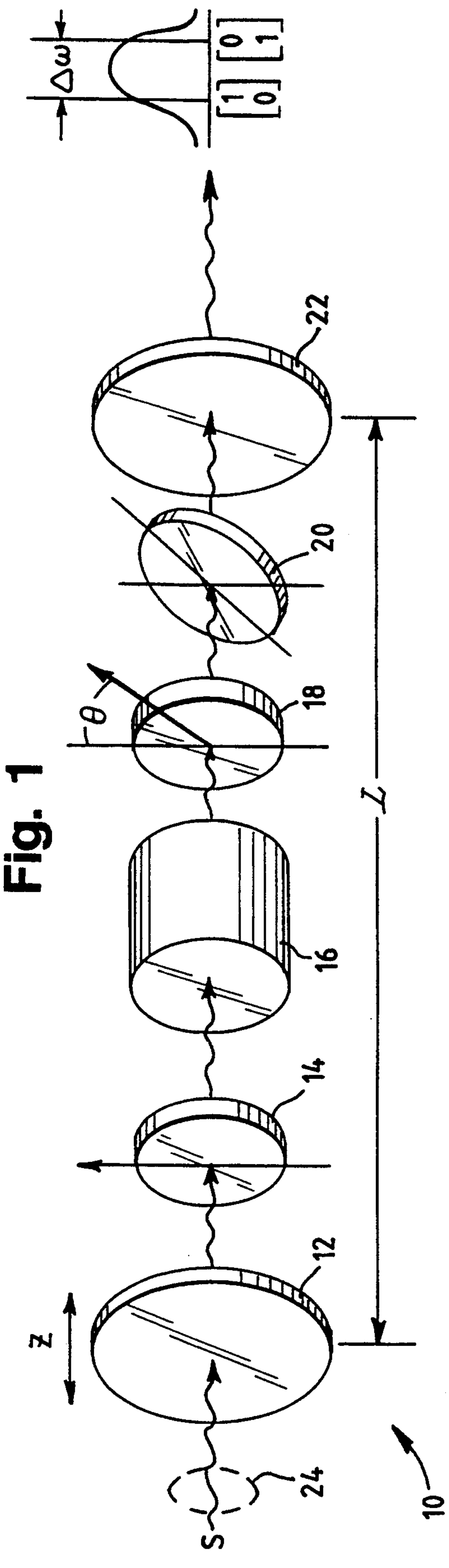

While this invention is susceptible of embodiment in many different forms, there is shown in the drawings, and will herein be described in detail, several specific embodiments of the invention. It should be understood, however, that the present disclosure is to be considered an exemplification of the principles of the invention and is not intended to limit the invention to the specific embodiments illustrated.

Turning to FIG. 1, a laser source 10 for use with present invention is illustrated. The laser 10 comprises an input mirror 12, a quarter waveplate (QWP)14, a lasant material 16 (e.g., Nd:YAG) or gain medium, another quarter waveplate 18, a mode selection element 20 (e.g., an etalon) and an output coupler 22.

The lasant material 16 is pumped by a source S. A focusing device or optics 24 may be used between the source and the lasant material. Suitable optical pumping means S include, but are not limited to, laser diodes, light-emitting diodes (including superluminescent diodes and superluminescent diode arrays) and laser diode arrays, together with any ancillary packaging or structures. For the purposes hereof, the term "optical pumping means" includes any heat sink, thermoelectric cooler or packaging associated with said laser diodes, light-emitting diodes and laser diode arrays. For example, such devices are commonly attached to a heat resistant and conductive heat sink and are packaged in a metal housing.

For efficient operation, the pumping means S is desirably matched with a suitable absorption band of the lasant material. Although the invention is not to be so limited, a highly suitable optical pumping source consists of a gallium aluminum arsenide laser diode, which emits light having a wavelength of about 810 nm, that is attached to a heat sink. The heat sink can be passive in character. However, the heat sink can also compromise a thermoelectric cooler or other temperature regulation means to help maintain laser diode at a constant temperature and thereby ensure optimal operation of laser diode at a constant wavelength. It will be appreciated, of course, that during operation the optical pumping means S will be attached to a suitable power supply. Electrical leads from laser diode S, which are directed to a suitable power supply, are not illustrated in the drawings.

Conventional light-emitting diodes and laser diodes S are available which, as a function of composition, produce output radiation having a wavelength over the range from about 630 nm to about 1600 nm, and any such device producing optical pumping radiation of a wavelength effective to pump a lasant material can be used in the practice of this invention. For example, the wavelength of the output radiation from a GaInP based device can be varied from about 630 nm to about 700 nm by variation of the device composition. Similarly, the wavelength of the output radiation from a GaAlAs based device can be varied from about 750 nm to about 900 nm by variation of the device composition. InGaAsP based devices can be used to provide radiation in the wavelength range from about 1000 nm to about 1600 nm.

If desired, the output facet of semiconductor light source S can be placed in butt-coupled relationship to input surface of the lasant material 16 without the use of optics 24. (See U.S. Pat. No. 4,847,851 to G. J. Dixon). As used herein, "butt-coupled" is defined to mean a coupling which is sufficiently close such that a divergent beam of optical pumping radiation emanating from semiconductor light source S or laser diode will optically pump a mode volume within the lasant material 16 with a sufficiently small transverse cross-sectional area so as to support essentially only single transverse mode laser operation (i.e., $TEM_{00}$ mode operation) in the lasant material.

Focusing means 24, if used, serves to focus pumping radiation from the source S into lasant material 16. This focusing results in a high pumping intensity and an associated high photon to photon conversion efficiency in lasant material. (See U.S. Pat. No. 4,710,940 to D. L. Sipes). Focusing means 24 can comprise any conventional means for focusing laser light such as a gradient index lens, a ball lens, an aspheric lens or a combination of lenses.

Suitable lasant materials 16 include, but are not limited to, solids selected from the group consisting of glassy and crystalline host materials which are doped with an active material and substances wherein the active material is a stoichiometric component of the lasant material. One highly suitable lasant material 16 is neodymium-doped YAG or Nd:YAG. By way of specific example, neodymium-doped YAG is a highly suitable lasant material 16 for use in combination with a laser diode source S that produces light having a wavelength of about 808 nm. When pumped with light of this wavelength, neodymium-doped YAG can emit light having a wavelength of about 1319 nm.

A laser cavity is formed by an input mirror 12 and an output coupler or mirror 22. The output mirror 22 is selected in such a manner that it is a few percent transmissive for the cavity radiation produced by the optical pumping means and highly transparent to output radiation which is generated by the lasant material.

In one particularly useful embodiment, the laser cavity uses Nd:YAG as the gain medium 16 to produce two linearly and orthogonally polarized modes separated in the optical frequency domain by a predetermined and adjustable amount in the range 0 to $\nu_c/2$, (e.g., $0.1<\Delta\nu<4$ GHz) where, $\nu_c$ (e.g., 8 GHz) is the cavity mode spacing. The light emitted by the lasing of Nd:YAG is contained within the linear standing wave optical cavity defined by the two end mirrors 12 and 22. The mode selective element 20 is included in the cavity to provide a wavelength selective loss within the cavity. The birefringence in the cavity is defined by the two quarter waveplates 14 and 18. Laser operation was achieved simultaneously at both cavity eigen-states. Optical mixing of the output of the laser of FIG. 1 results in an optical signal modulated at a frequency $\Delta\nu$. The mode-mode polarization extinction ratio was $>30$ dB with an electronically controllable power splitting ratio of $3\pm1$ dB. This RF beatnote is immune, to the first order, to the cavity related fluctuations and noise. This noise immunity arises from a large degree of common mode rejection between the spatially superimposed co-linear modes.

From a Jones matrix analysis of the cavity, it can be shown that the separation of the two eigen-modes (i.e. vertically polarized $\nu_v$ mode and horizontally polarized $\nu_h$ mode) in the frequency domain, $\Delta\nu=\nu_v-\nu_h$, is linearly proportional to the relative orientation of the fast axes of the quarter waveplates 14 and 18. In a Poincare Sphere representation of the polarization states, the laser output is a time dependent polar vector with latitude $\Delta\omega t$ along a meridian, where $\Delta\omega=2\pi\Delta\nu$, where $\omega$ is the annular frequency of the laser light. This output can be considered as a "randomly polarized" radiation, provided the detection integration period is greater thatn $1/\Delta\nu$ seconds.

This RF beat-note is immune, to first order, to the cavity related fluctuations and noise. This noise immunity arises from a large degree of common mode rejection between the spatially superimposed co-linear modes. Low frequency noise over the DC to 200 KHz bandwidth is in the $-110$ dBc/Hz range. Tests have shown that the RF characteristics of the self heterodyned beat frequency (in the GHz range) exhibit a jitter of $<500$ Hz (16 seconds integration period) with a stability of about 1 MHz over a 24 hour period.

Improvements of nearly two orders of magnitude in these parameters can be obtained in a closed-loop operation where the RF beat frequency is compared against a reference frequency. (See M. J. Wale et al. "Microwave Signal Generation Using Optical Phase Lock Loops," 21*st European Microwave Conference,* 1991 Stuttgart). Wale used a piezoelectric transducer that was attached to one of the cavity mirrors and that was driven in response to the error voltage. The measured tuning coefficients were $\delta(\Delta\nu)/\delta(\text{voltage})=10$ KHz/Volt and $\delta(\nu_i)/\delta(\text{voltage})=10$ MHz/Volt, i=v and i=h, respectively. The piezo-electric transducer was also used to electronically control the mode-mode power splitting ratio in the range 3±1 dB. The all-optically generated beat frequency in the GHz range can then be used as a carrier to transform the signals, $f_m$, from base band to high frequency, $\Delta\nu \pm f_m$, and to enable heterodyne detection of the modulation signal. This approach considerably increases the system measurement dynamic range compared to that of direct detection.

Another improvement that can be made to the laser of FIG. 1 is to follow the teachings of U.S. Patent application Ser. No. 708,501 (filed on May 13, 1991 and assigned to the assignee of the present invention), now U.S. Pat. No. 5,177,755. In such a laser the relative intensity noise (RIN), at and around the carrier, is shot noise limited, <−170 dBc/Hz. Electronic feedback circuitry makes this possible.

Figure 2:
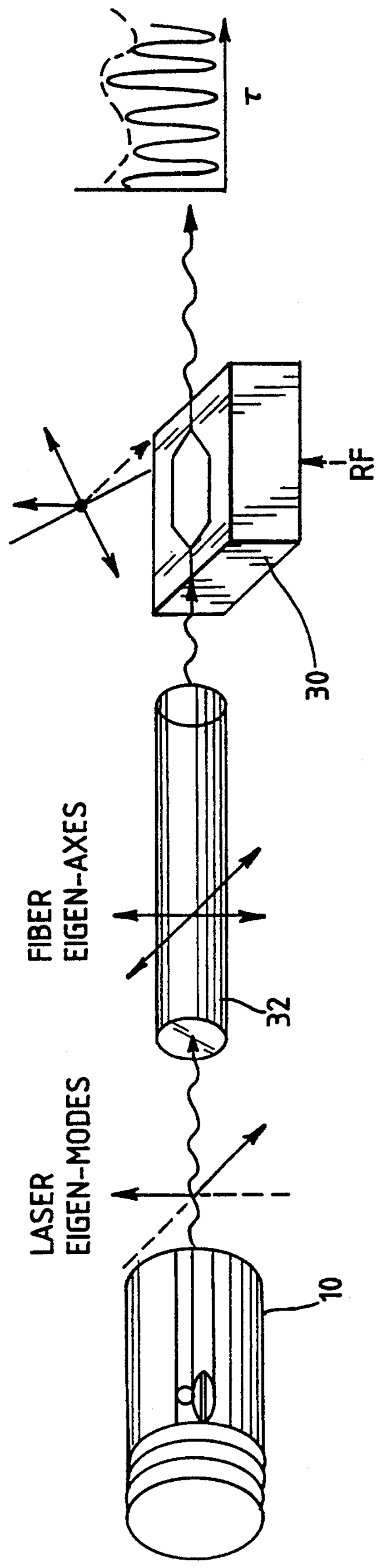

Turning to FIG. 2, there is illustrated on optical system, using an amplitude modulator 30 and a polarization-maintaining (PM) optical fiber 32 based on heterodyned processing. The eigen-axes of the birefringent link fiber 32, between the laser source 10 and the modulator 30, are aligned with those of the laser and are positioned at 45 degrees to those of the amplitude modulator. The modulator transfer function, $K_{am}$, is represented by the matrix:

$$\begin{pmatrix} 1 + e^{is} & 0 \\ 0 & 0 \end{pmatrix}$$

where $s=A_m \sin(\omega_m t)$ and represents the modulation signal generated phase evolution, $\omega_m=2\pi f_m$, and where $A_m$ is the signal amplitude. The linearly birefringent fiber 32 is represented by the matrix, $K_{hb}$, represented by:

$$\begin{pmatrix} e^{i\phi} & 0 \\ 0 & 1 \end{pmatrix}$$

where $\Phi$ is the differential or polarimetric phase evolution in the fiber eigen-modes. The link output electric field vector is, therefore, given by:

$$E=[R^{-}\cdot K_{am}\cdot R^{+}\cdot K_{hb}]\cdot E_o$$

where $R^{\pm}$ represent the rotation matrices through ±45 degrees respectively and $E_o$ represents the laser output electric field complex vector. When the fiber eigen-modes are equally populated, the modulator output intensity function is:

$$I=E^{*}\cdot E$$

where "*" denotes the complex conjugate. "I" is an amplitude, modulated output signal which can be expanded as:

| | | |
|---|---|---|
| $DC$ term | $+\cos(\Delta\omega t + \phi)$ | "carrier" |
| | $+\cos[(A_m \sin(\omega_m t)]$ | "base band" |
| | $+\cos[(\Delta\omega t + \phi) - (A_m \sin(\omega_m t))]$ | "lower side band" |
| | $+\cos[(\Delta\omega t + \phi) + (A_m \sin(\omega_m t))]$ | "upper side band". |

It should be appreciated that this approach considerably increases the system measurement dynamic range compared to that of direct detection. In addition, heterodyne detection offers greater sensitivity, further increasing the system dynamic range.

Figure 3:
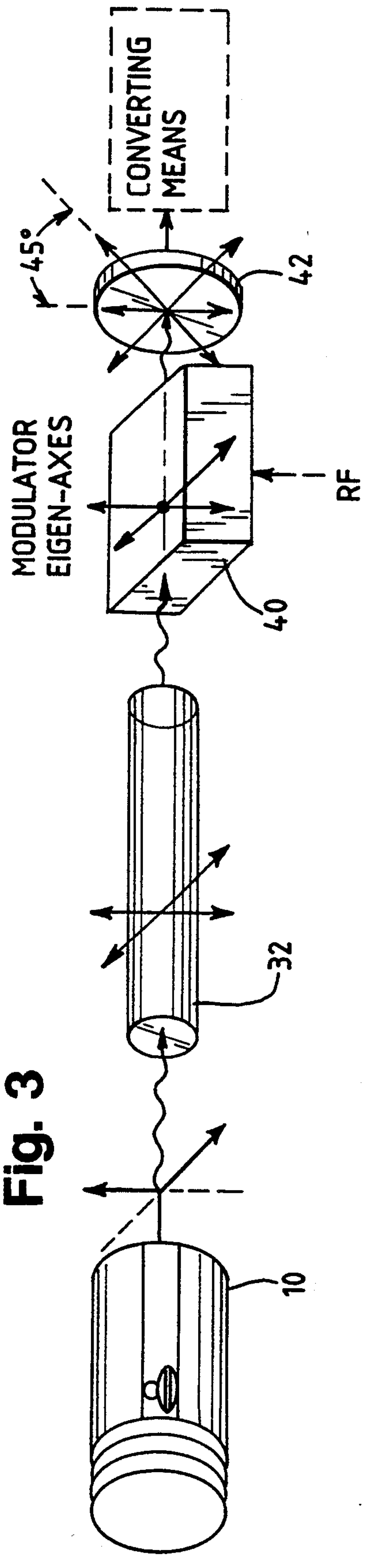

Turning to FIG. 3, there is illustrated an optical system using a phase modulator 40, instead of an intensity modulator. The phase of the optically generated RF carrier is proportional to the relative phases of the two orthogonal modes. Ion exchange waveguides in lithium niobate are capable of supporting both polarization states and the electro-optic coefficients for the two orthogonal states vary by as much as 3:1. In FIG. 3, the highly-linearly-birefringent link fiber 32 has its eigen-axes aligned with those of the phase modulator 40 and the laser 10. A polarizer 42 located at the output of the phase modulator 40, which can form part of the modulator device, produces a modulated output signal. The link output, is a frequency modulated RF cartier given by:

$$DC\ \text{term}+\cos\left[\Delta\omega t+\Phi+(1-\gamma^{-1})A_m \sin(\omega_m t)\right]$$

where $\Phi$ is the differential or polarimetric phase evolution in the eigenmodes of the highly-linearly-birefringent link fiber 32 and where $\gamma$ expresses the differential response between the modulator eigen-modes to an applied signal.

It will be appreciated that, by using a phase modulator 40, instead of an interferometric amplitude modulator (i.e., FIG. 2), cost is reduced and system complexity is reduced. Those skilled in the art will also appreciate that the main advantages associated with this architecture are the high measurement sensitivities associated with coherent detection and the 3 dB gain in the optical power budget by using a phase modulator. Moreover, in a phase sensitive approach, the down lead becomes essentially insensitive to environmental perturbations, affected only by differential or polarimetric phase evolutions, due to common mode rejection between the orthogonal eigen-modes of the fiber.

Figure 4:
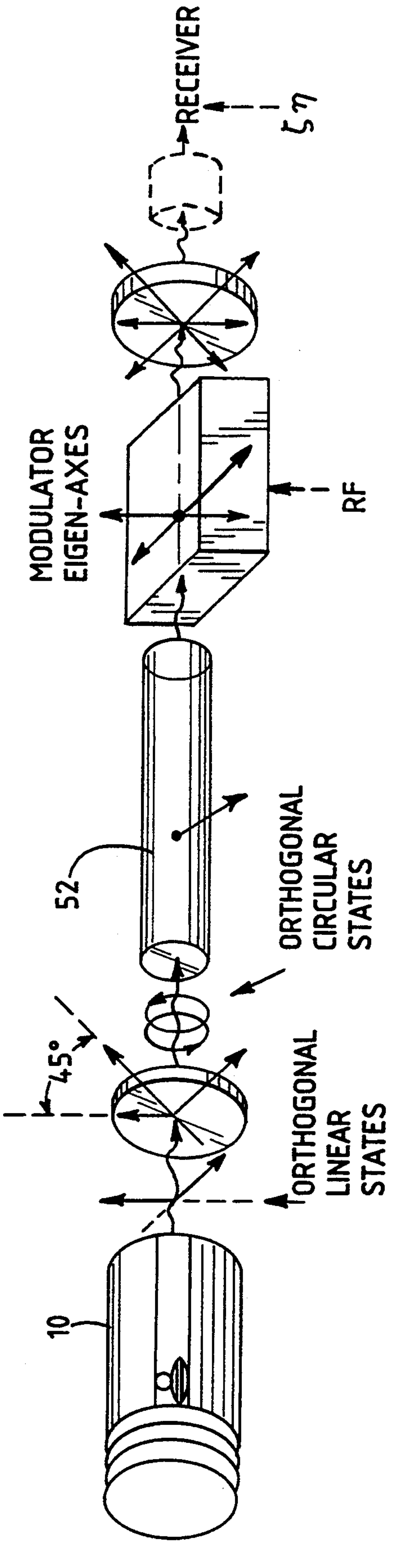

Turning to FIG. 4, there is illustrated an optical link involving the conversion of the two orthogonal-linear-polarization states of the laser's 10 output into two orthogonal-circular-polarization states. This is achieved using a quarter-wave retardation plate 50 with its fast-axis at 45 degrees to the laser's eigen-axes. The resulting Poincare polar vector describes a rotating linear state along the equator with azimuth, $\Delta\omega t$. Here a low-birefringence single-mode optical fiber 52 is used between the source 10 and the modulator 40. The fiber transfer matrix can be expressed in terms of its circular birefringence $\sigma_c$ and linear birefringence $\sigma_l$. The circular birefringence of the fiber $\sigma_c$ results in a quasi-steady phase shift of the RF carrier, whereas, the linear birefringence of the fiber $\sigma_l$ effects the phase of the detected signal.

However, the magnitude of the net linear birefringence in a long length of single-mode fiber is small, particularly, in the absence of externally induced birefringence in the fiber.

Following an analysis similar to that given in connection with FIGS. 2 and 3, the output is represented by:

$$DC\ \text{term} + \cos[\Delta\omega t + \sigma_c]\cos[(1-\gamma^{-1})A_m \sin(\omega_m t) + \sigma_1]$$

describes an RF carrier with full AM modulation.

Those skilled in the art will appreciate that in this configuration, because the down-lead is a low-birefringence single-mode fiber, there is a 3 dB power budget penalty. However this approach offers substantial savings in the link cost.

From the foregoing analysis it is clear that all-optical generation of highly stable RF carriers enabling self-heterodyning yields much improved system performance. Moreover, the embodiments described are suitable for use in both amplitude and phase modulation domains. Finally, links, using low-birefringence single-mode fiber have been described that have increased down-lead insensitivity to environmental perturbations. Thus, numerous variations, alternatives and modifications will be apparent to those skilled in the art. Accordingly, the foregoing description is to be construed as illustrative only and is for the purpose of teaching those skilled in the an the manner of carrying out the invention. Various changes may be made, materials substituted and features of the invention may be utilized. For example, the RF carrier can also be electronically modulated using electro-optic material in the laser cavity. In addition many of the principals just described are equal applicable to phased array radar, where system performance requirements include the need to simultaneously process information from a large number of channels at high speeds to permit the correlation of large amounts of information.

Thus, it will be appreciated that various modifications, alternatives, variations, etc., may be made without departing from the spirit and scope of the invention as defined in the appended claims. It is, of course, intended to cover by the appended claims all such modifications involved within the scope of the claims.

I claim:

1. Apparatus for use in an antenna remoting system, comprising:
   a) a single source of laser light having an output characterized by two distinct polarizations and at least two closely separated frequencies; and
   b) a fiber optic communications link, joined to said source and having a modulator therein, that operates in response to a radio frequency information signal such that said modulator produces a beat frequency output that is a function of the sum of said two closely separated frequencies, said beat frequency output having radio frequency sidebands corresponding to said radio frequency information signal.

2. The apparatus of claim 1, wherein said source comprises a laser having as an output two frequencies which are separated by an adjustable and predeterminable amount.

3. The apparatus of claim 2, wherein said two frequencies are adjustable between 0.1 and 4.0 GHz.

4. The apparatus of claim 2, wherein said amount is between 0 and ½ where $\nu_c$, where $\nu_c$ is the cavity mode spacing.

5. The apparatus of claim 1, wherein said source comprises a laser light source and is characterized by two linear and orthogonal polarization modes.

6. The apparatus of claim 5, wherein said source comprises a solid-state diode-pumped laser having a cavity formed by two mirrors and having an etalon between said two mirrors.

7. The apparatus of claim 1, wherein said modulator is connected to said single source by a polarization maintaining optical fiber.

8. The apparatus of claim 7, wherein said modulator is an intensity modulator.

9. The apparatus of claim 8, wherein said fiber has eigen-axes which are aligned with those of said laser and at about 45° to those of said modulator.

10. The apparatus of claim 7, wherein said modulator is a phase modulator.

11. The apparatus of claim 10, wherein said fiber has eigen-axes which are aligned to those of said laser and to those of said modulator; and further including a polarizer located at the output of said modulator.

12. The apparatus of claim 1, wherein said source is connected to said modulator by a single-mode optical fiber; and further including:
   c) a quarter-wave plate located between said source and said modulator and having its fast axis at about 45° to the eigen-axes of said laser; and
   d) a polarizer located at the output of said modulator and having its fast axis at about 45° to the eigen-axes of said modulator.

13. The apparatus of claim 1, further including:
   c) receiver means for converting said beat frequency output of said modulator to a signal which is representative of said radio frequency information signal.

14. The apparatus of claim 13, wherein said convening means includes receiver means for heterodyning said beat frequency output with another frequency.

15. The apparatus of claim 1, wherein said source of laser light comprises: one optical cavity having a solid lasant material located therein, spatial hole burning control means located at each end of said lasant material; and a mode selective means located between said spatial hole burning control means and one end of said cavity.

16. The apparatus of claim 15, wherein said spatial hole burning control means comprises two quarter-wave plates which are located at opposite ends of said lasant material.

17. A fiber optic communications link, comprising:
   a) a diode pumped solid state laser having a laser light output characterized by two spatially superimposed and orthogonal linearly polarized modes at two closely separated frequencies;
   b) a modulator that receives said laser light and that is driven by a radio frequency information signal such that said modulator produces a beat frequency output that is a function of the sum of said two closely separated frequencies;
   c) convening means, receiving said output of said modulator, for converting said beat frequency output to a signal that is representative of said radio frequency information signal by mixing said beat frequency output with another frequency; and d) an optical fiber for connecting said modulator to said laser and to said convening means.

18. The link of claim 17, wherein said laser comprises: an elongated optical cavity having a solid-state lasant material located therein; spatial hole burning control means located at each end of said lasant material; and a mode selective element located between said spatial hole burning control means and one end of said cavity.

19. The link of claim 17, wherein said modulator is an intensity modulator.

20. The link of claim 19, wherein said fiber has eigen-axes which are aligned with those of the laser and at about 45° to those of said modulator.

21. The link of claim 17, wherein said modulator is a phase modulator.

22. The link of claim 21, wherein said fiber has eigen-axes which are aligned to those of said laser and to those of said modulator; and further including:

e) a polarizer located at the output of said modulator.

23. The link of claim 17, wherein said laser is connected to said modulator by a single-mode optical fiber, and further including:

e) a quarter-wave plate located between said laser and said modulator and having its fast axis at about 45° to the eigen-axes of said laser; and f) a polarizer located at the output of said modulator and having its axes at about 45° to the eigen-axes of said modulator.

24. A method of reducing the noise content in a modulated optical signal travelling through an optical fiber comprising the steps of:

a) providing a single source of laser light whose output is characterized by at least two distinct polarizations and two closely separated frequencies; and b) transmitting said light through a fiber optic communications link having a modulator therein which is driven by a radio frequency information signal such that said modulator produces a beat frequency output which is a function of the sum of said two closely separated frequencies, said beat frequency output having radio frequency sidebands corresponding to said radio frequency information signal.

25. The method of claim 24, where step (a) is performed using a laser having an output characterized by two frequencies which are separated by an adjustable and predeterminable amount and by two linear and orthogonal polarization modes.

26. The method of claim 24, where step (b) is performed by using a polarization maintaining optical fiber and a phase modulator.

27. The method of claim 24, where step (b) is performed by using an optical fiber having eigen-axes which are aligned with those of the laser and at about 450 to those of the modulator and by using an intensity modulator.

28. The method of claim 24, where step (b) is performed by using an optical fiber having eigen-axes which are aligned to those of said laser and to those of said modulator; and further including the step of:

c) locating a polarizer at the output of said modulator.

29. The method of claim 24, where step (a) is performed by using: a source which is connected to said modulator by a single-mode optical fiber; and further including the steps of:

c) locating a quarter-wave plate between said source and said modulator to have its fast axis at about 45° to the eigen-axes of said laser; and d) locating a polarizer having its axis at about 45° to the eigen-axes of said modulator.

30. The method of claim 24, further including the step of:

c) heterodyning said beat frequency output with another frequency to convert said beat frequency output of said modulator to a signal that is representative of said radio frequency information signal.

* * * * *